US011558929B2

(12) United States Patent
Kim et al.

(10) Patent No.: US 11,558,929 B2
(45) Date of Patent: *Jan. 17, 2023

(54) CONTROL INFORMATION MONITORING FRAMEWORK FOR CELLULAR COMMUNICATION

(71) Applicant: Apple Inc., Cupertino, CA (US)

(72) Inventors: Yuchul Kim, Santa Clara, CA (US); Junsung Lim, San Jose, CA (US); Wei Zeng, San Diego, CA (US); Haitong Sun, Irvine, CA (US); Wei Zhang, Santa Clara, CA (US); Galib A. Mohiuddin, San Diego, CA (US); Sami M. Almalfouh, San Jose, CA (US); Yang Li, Plano, TX (US); Zhu Ji, San Jose, CA (US); Tianyan Pu, Cupertino, CA (US); Dawei Zhang, Saratoga, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,444

(22) Filed: Mar. 1, 2022

(65) Prior Publication Data
US 2022/0191972 A1 Jun. 16, 2022

Related U.S. Application Data

(63) Continuation of application No. 16/288,383, filed on Feb. 28, 2019, now Pat. No. 11,304,261.
(Continued)

(51) Int. Cl.
H04W 88/06 (2009.01)
H04W 24/08 (2009.01)
(Continued)

(52) U.S. Cl.
CPC ........... *H04W 88/06* (2013.01); *H04W 24/08* (2013.01); *H04W 72/042* (2013.01); *H04W 72/0446* (2013.01); *H04W 76/28* (2018.02)

(58) Field of Classification Search
CPC ..... H04W 88/06; H04W 24/08; H04W 76/28; H04W 72/0446
See application file for complete search history.

(56) References Cited

U.S. PATENT DOCUMENTS

2010/0322158 A1* 12/2010 Lee ................. H04L 1/0072
370/329
2017/0181219 A1 6/2017 Cesares Cano et al.
(Continued)

FOREIGN PATENT DOCUMENTS

CN 1674455 A 9/2005
CN 103270794 A 8/2013
(Continued)

OTHER PUBLICATIONS

Shariatmadari et al, "Fifth-Generation Control Channel Design", 2018 (Year: 2018).*
(Continued)

*Primary Examiner* — Omer S Mian
(74) *Attorney, Agent, or Firm* — Kowert, Hood, Munyon, Rankin & Goetzel, P.C.

(57) ABSTRACT

This disclosure relates to performing cellular communication using a control information monitoring framework. A wireless device may monitor a control channel for control information according to a first periodic pattern. According to the first periodic pattern, the wireless device may monitor the control channel in a specified slot during each period of the first periodic pattern. Each period of the first periodic pattern may include multiple slots. The wireless device may receive control information during a first slot. The first slot may be a specified slot according to the first periodic pattern.
(Continued)

The control information received during the first slot may schedule a data communication. The wireless device may monitor the control channel for control information in at least one slot that is not specified according to the first periodic pattern based at least in part on receiving control information during a specified slot according to the first periodic pattern.

20 Claims, 9 Drawing Sheets

Related U.S. Application Data

(60) Provisional application No. 62/670,020, filed on May 11, 2018.

(51) Int. Cl.
    *H04W 76/28*     (2018.01)
    *H04W 72/04*     (2009.01)

(56) References Cited

U.S. PATENT DOCUMENTS

| | | | |
|---|---|---|---|
| 2017/0251466 A1* | 8/2017 | Astely | H04L 5/0037 |
| 2017/0280341 A1 | 9/2017 | Nigam et al. | |
| 2017/0311370 A1 | 10/2017 | Dalsgaard et al. | |
| 2018/0176892 A1* | 6/2018 | Kim | H04W 52/386 |
| 2018/0227889 A1* | 8/2018 | Yang | H04L 5/0091 |
| 2019/0045492 A1* | 2/2019 | Urabayashi | H04W 74/0833 |
| 2019/0230696 A1* | 7/2019 | Kim | H04L 5/0007 |
| 2019/0335425 A1* | 10/2019 | Seo | H04L 1/0045 |
| 2019/0349806 A1* | 11/2019 | Nam | H04L 5/0053 |
| 2019/0356424 A1* | 11/2019 | Urabayashi | H04L 5/0055 |
| 2020/0037389 A1* | 1/2020 | Feuersaenger | H04W 72/042 |
| 2020/0092880 A1* | 3/2020 | Choi | H04L 5/0094 |

FOREIGN PATENT DOCUMENTS

| | | |
|---|---|---|
| CN | 105848182 A | 8/2016 |
| WO | 2017170157 A1 | 10/2017 |
| WO | 2018031327 A1 | 2/2018 |
| WO | 2018065050 A1 | 4/2018 |

OTHER PUBLICATIONS

First Office Action for Chinese Patent Application No. 201910386541.5; dated Sep. 3, 2021.

CATT "Discussion on NR-PDCCH monitoring"; 3GPP TSG RAN WG1 Meeting #89 R1-1707496; Hangzhou, P.R. China; May 15-19, 2017.

Huawei et al. "PDCCH monitoring conditional on data scheduling"; 3GPP TSG RAN WG1 Meeting #89 R1-1708152; Hangzhou, P.R. China; May 15-19, 2017.

Apple Inc. "Control indicator in group-common PDCCH for UE power saving"; 3GPP TSG-RAN WG1 NR#2 R1-1710907; Qingdao, China; Jun. 27-30, 2017.

Shariatmadari et al. "Fifth-Generation Control Channel Design;" 2018.

* cited by examiner

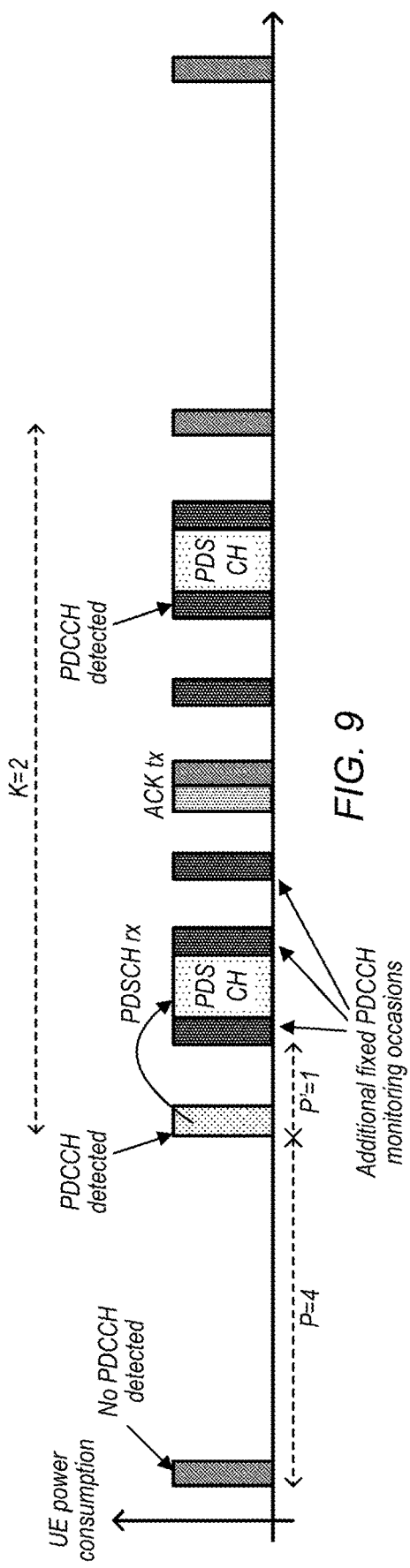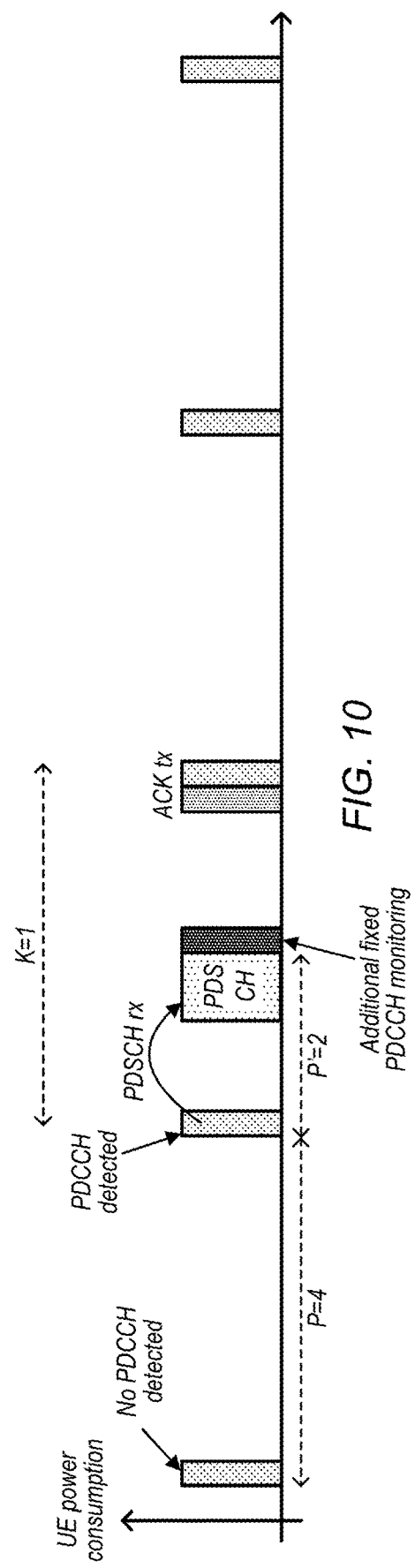

CONTROL INFORMATION MONITORING FRAMEWORK FOR CELLULAR COMMUNICATION

PRIORITY INFORMATION

This application is a continuation of U.S. patent application Ser. No. 16/288,383, entitled "Control Information Monitoring Framework for Cellular Communication," filed Feb. 28, 2019, which claims priority to U.S. provisional patent application No. 62/670,020, entitled "Control Information Monitoring Framework for Cellular Communication," filed May 11, 2018, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for providing a control information monitoring framework for cellular communication.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements for wireless communications while allowing the UE device to maintain good transmit and receive abilities for improved communications. Accordingly, improvements in the field are desired.

SUMMARY

Embodiments are presented herein of apparatuses, systems, and methods for providing a control information monitoring framework for cellular communication.

According to the control information monitoring framework, it may be possible for a cellular base station to provide control information to wireless devices in accordance with a periodic monitoring configuration, such that the wireless device may be expected to monitor a control channel for control information during only a subset of each control information monitoring period. As a result, the wireless device may be able to reduce its power consumption by placing at least some wireless device components into a low power mode (e.g., 'sleeping') during the portion of each control information monitoring period that the wireless device is not expected to monitor the control channel rather than continuously monitoring the control channel.

Further according to the control information monitoring framework, there may be an arrangement for configuring additional opportunities for the cellular base station to provide control information, e.g., in case there is demand to communicate more data than could be supported by the periodic monitoring configuration.

As one possibility for the arrangement for configuring additional control information provision opportunities, each time the cellular base station provides control information to the wireless device, this may implicitly schedule an additional control channel monitoring window for the wireless device, e.g., at a predetermined time relative to when the control information is provided.

As another possibility for the arrangement for configuring additional control information provision opportunities, when the cellular base station provides control information to the wireless device, this trigger a modification of the periodic monitoring configuration, e.g., to a configuration in which the subset of each control information monitoring period that the wireless device is expected to monitor the control channel for control information may represent a greater proportion of each control information monitoring period.

Such a dynamic control channel monitoring framework may result in reduced wireless device power consumption while retaining substantial network scheduling flexibility and with little or no reduction to potential wireless device throughput, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 6-11 illustrate various aspects of exemplary possible frameworks for control information monitoring in a cellular communication system, according to some embodiments.

Figure 1:
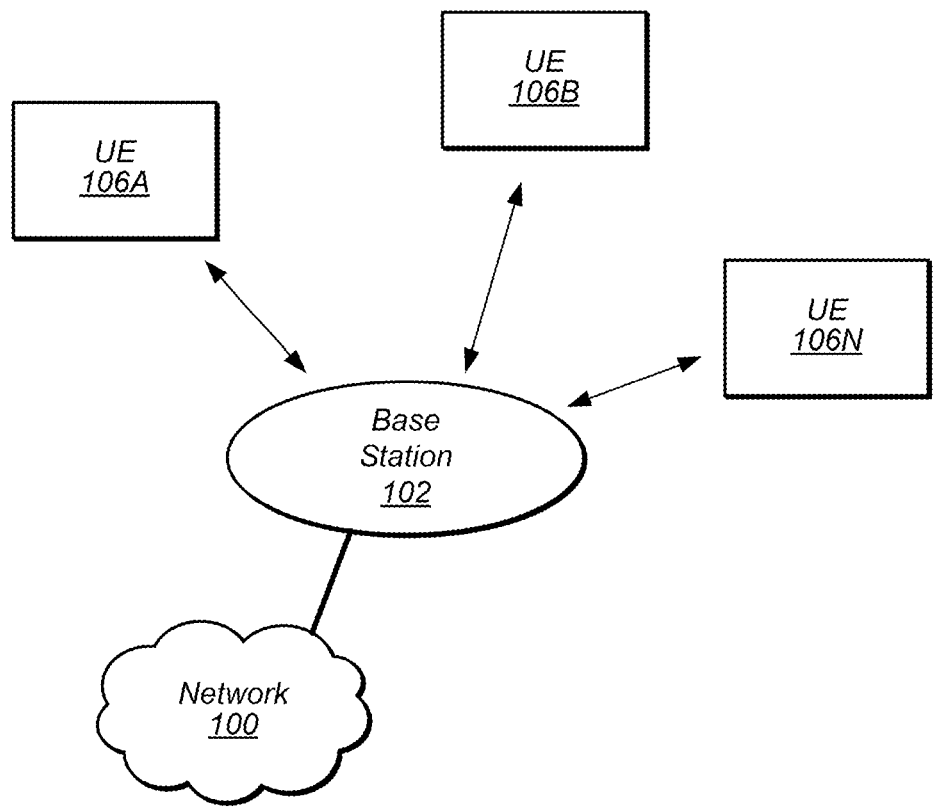
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
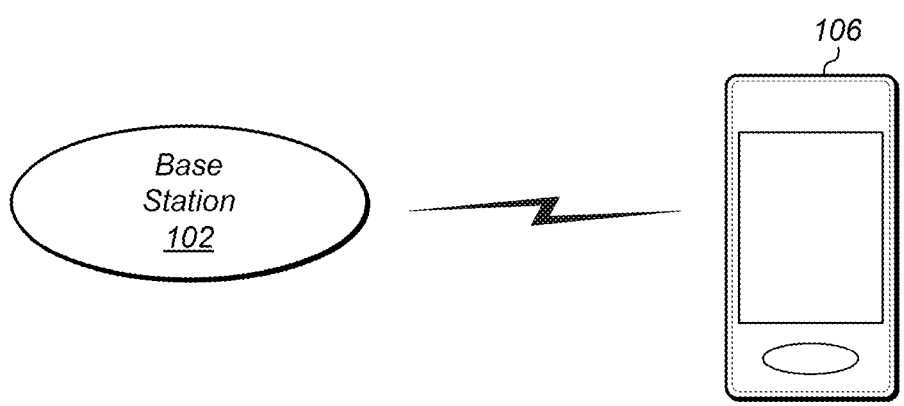
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using a control channel monitoring framework such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, LTE or GSM), and separate radios for communicating using each of Wi-Fi and BLUETOOTH™. Other configurations are also possible.

Figure 3:
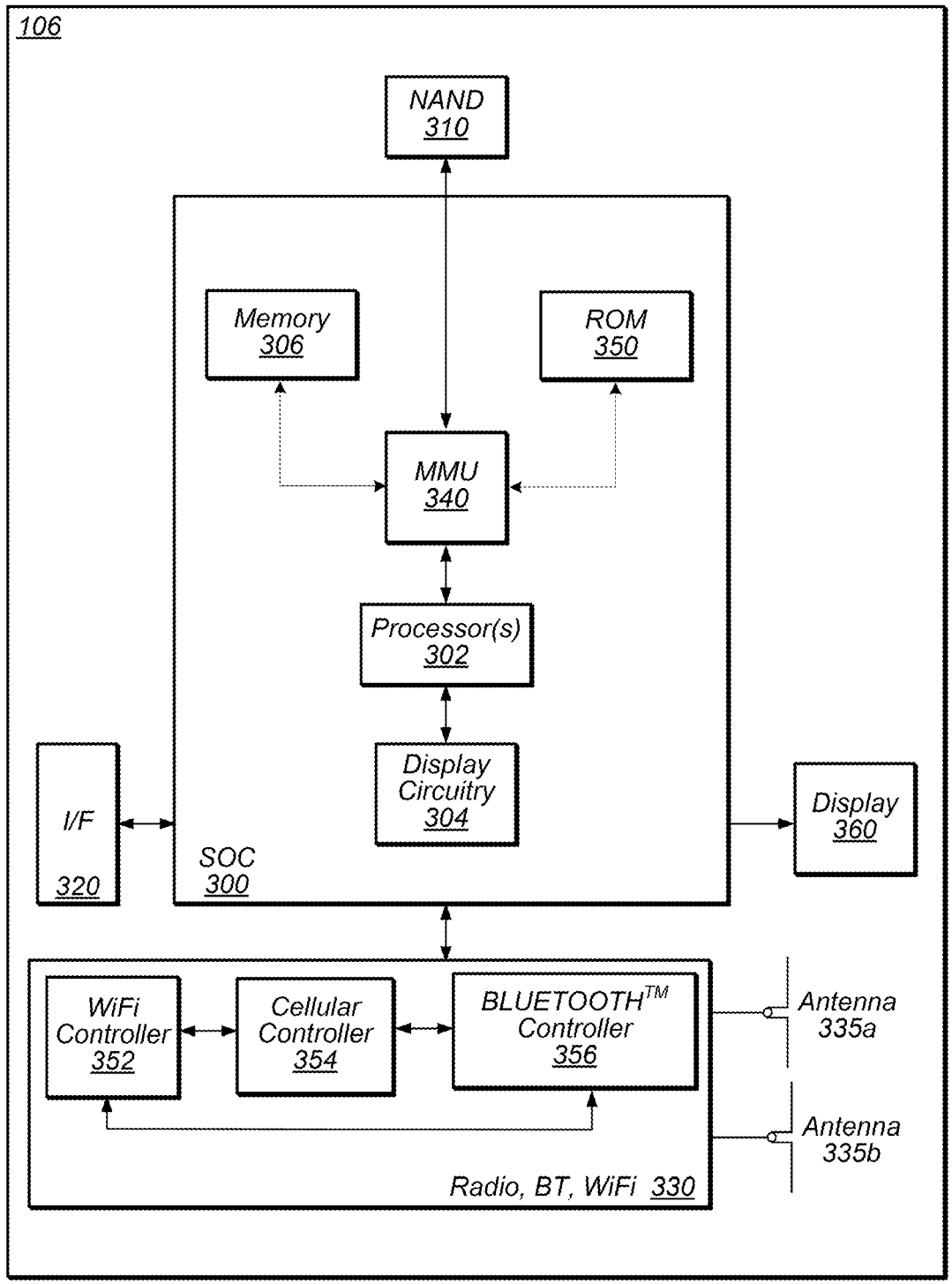
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform cellular communication using a control information monitoring framework such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication using a control information monitoring framework according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
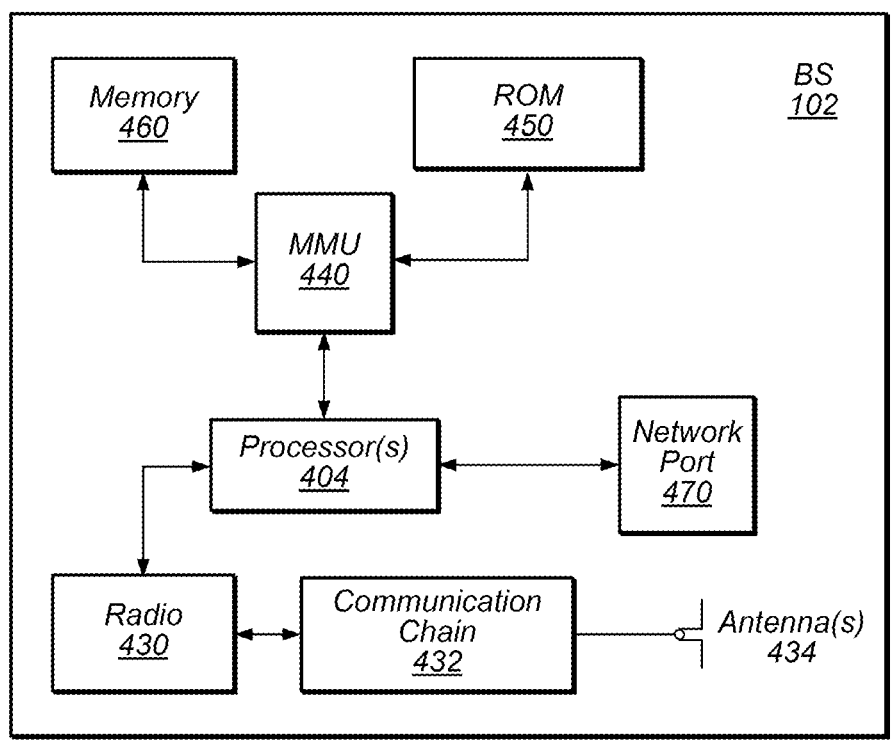
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard. The base station 102 may operate according to the various methods as disclosed herein for performing cellular communication in accordance with a control information monitoring framework.

Figure 5:
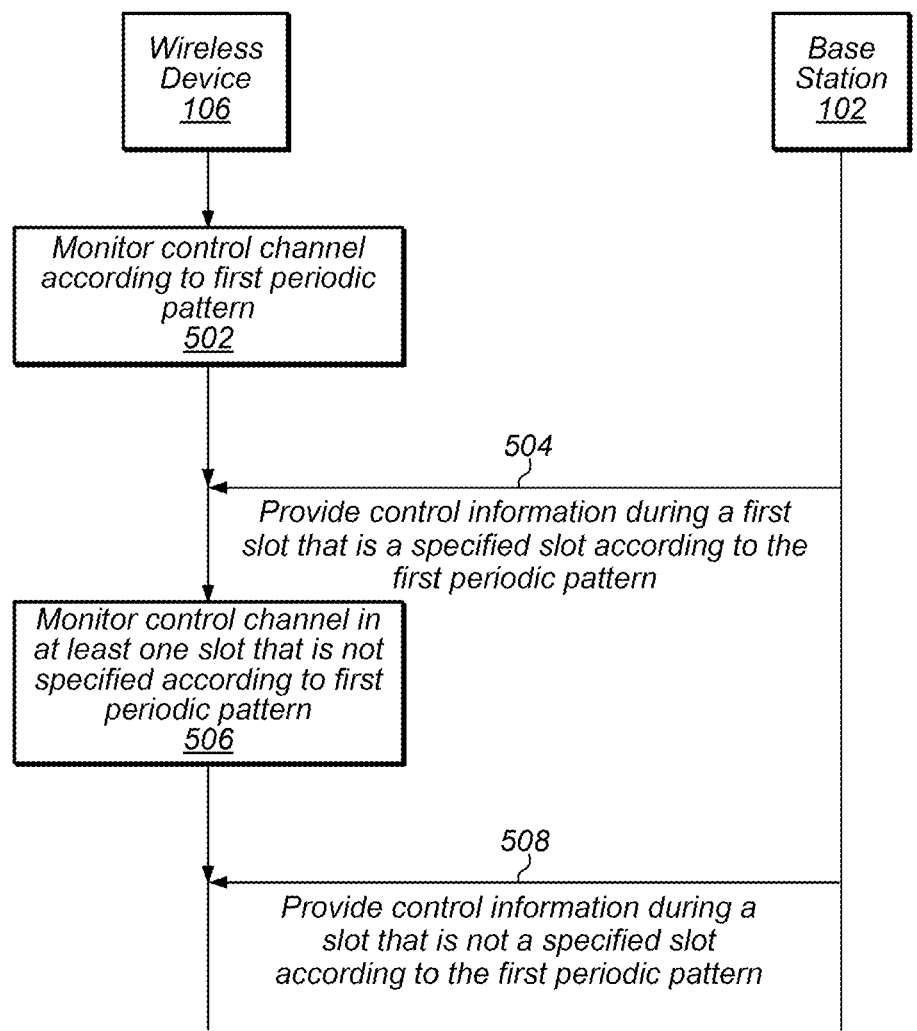
FIG. 5 is a communication flow diagram illustrating aspects of an exemplary possible method for providing a control information monitoring framework for cellular communication, according to some embodiments.

FIG. 5—Control Information Monitoring Framework for Cellular Communication

FIG. 5 is a communication flow diagram illustrating a method for wireless devices (e.g., a cellular base station and a wireless user equipment (UE) device, as shown, as one possibility) to perform cellular communication using a control information monitoring framework, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer circuitry, systems, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired.

In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a wireless device may monitor a control channel according to a first periodic pattern. The wireless device may monitor the control channel for control information that its serving base station may provide, e.g., to schedule a downlink or uplink data communication or acknowledgement, or for any of various other possible purposes. For example, the control channel may be a physical downlink control channel (e.g., a NR-PDCCH if the serving base station is a 5G NR base station, or a LTE-PDCCH if the serving base station is a LTE base station), which the base station may use to provide control information to schedule resources of a physical downlink shared channel or a physical uplink shared channel for the wireless device for a downlink data communication, an uplink data communication, or an acknowledgement.

Performing control channel monitoring according to the first periodic pattern may include monitoring the control channel in a specified slot (or set of slots) during each period of the first periodic pattern. Each period of the first periodic pattern may include multiple communication slots. It may be the case that if the cellular base station does not provide control information to the wireless device on the control channel in the specified slot(s) during a given period, the base station may also not provide control information to the wireless device on the control channel for a remainder of the slots of the period (e.g., in accordance with cellular communication standard specifications for a cellular communication technology used by the wireless device and the base station, configuration information previously provided by the base station, and/or any of various other possible arrangements/agreements). Thus, the wireless device may not miss any control information even if the wireless device does not monitor the control channel during those slots, and thus may further be able to enter a low power (e.g., sleep) mode until the next specified slot according to the first periodic pattern, if no control information is detected on the control channel during one or more specified slots according to the first periodic pattern, at least according to some embodiments.

In 504, the base station may provide control information to the wireless device using the control channel during a first slot, which may be a specified slot according to the first periodic pattern. The wireless device may be monitoring the control channel during the first slot (e.g., in accordance with the first periodic pattern), and so may be able to detect and receive the control information. The control information received during the first slot may schedule a data communication, such as an uplink or downlink data communication or an acknowledgement, as previously noted herein. The data communication may also be scheduled for the first slot, or may be scheduled for a subsequent slot (e.g., same-slot scheduling or cross-slot scheduling may be used).

In 506, the wireless device may monitor the control channel for control information in at least one slot that is not specified according to the first periodic pattern. Such monitoring of the control channel in addition to those slots specified according to the periodic pattern may be based at least in part on the wireless device having received control information during a specified slot according to the first periodic pattern (e.g., the first slot). For example, receiving control information while monitoring the control channel according to the first periodic pattern may trigger opportunistic monitoring of one or more additional slots by the wireless device, and/or may trigger a (e.g., temporary) transition to a second stage of periodic monitoring of the control channel. Such additional monitoring may help support the possibility of providing more data communication opportunities to the wireless device, which may improve data throughput to the wireless device and/or increase overall network resource usage efficiency, among various possible benefits.

The wireless device may perform such additional control channel monitoring in a manner known by (e.g., configured by or otherwise in accordance with some pre-agreement with) the base station. Thus, the cellular base station may expect the wireless device to monitor the control channel in the at least one slot that is not specified according to the first periodic pattern, and so, in 508, the base station may provide control information during a slot that is not a specified slot according to the first periodic pattern (e.g., and that the base station expects that the wireless device will be monitoring the control channel). As the wireless device may be monitoring the control channel during that slot, the wireless device may be able to detect and receive the control information during the slot that is not a specified slot according to the first periodic pattern.

Any of a variety of possible configurations may be used for the additional control channel monitoring such that the wireless device and the base station may mutually be aware of the slot(s) in which control information may be provided to the wireless device in addition to those specified according to the first periodic pattern. As one possibility, an opportunistic control channel monitoring/scheduling arrangement may be used, e.g., such that a wireless device may monitor the control channel in a slot that occurs at a specified interval after the slot in which the control information is provided, such as the same slot in which the data communication is scheduled (e.g., if cross-slot scheduling is used), a slot immediately after a slot in which the scheduled data communication occurs, or any other slot that can be predetermined by both the wireless device and the cellular base station in relation to provision of the control information. For example, monitoring the control channel for control information in at least one slot that is not specified according to the first periodic pattern may include monitoring the control channel in a second slot that occurs at a specified interval after the first slot, as one possibility. Such opportunistic monitoring may be chained for any number of additional potential scheduling opportunities; for example, the base station could provide control information during the second slot that schedules a data communication, in which case the wireless device may further monitor the control channel during a third slot that occurs at a specified interval after the second slot, according to such a framework.

As another possibility, a multi-stage control channel monitoring/scheduling arrangement may be used. For example, provision of control information during a specified slot according to the first periodic pattern may trigger the wireless device to (e.g., temporarily) monitor the control channel according to a second periodic pattern. The second periodic pattern may include more dense control channel monitoring (e.g., a higher proportion of slots specified as slots to be monitored by the wireless device) than the first periodic pattern; for example, the second periodic pattern may have a shorter period than the first periodic pattern, or may include a greater number of slots specified as slots to be monitored by the wireless device during each period than the first periodic pattern, among various possibilities. Thus, the wireless device may monitor the control channel according to the second periodic pattern based at least in part on receiving control information during a specified slot according to the first periodic pattern, according to such a framework. The wireless device may monitor the control channel according to the second periodic pattern for a certain specified duration (e.g., one or more periods according to the first periodic pattern, as one possibility), and may subsequently resume monitoring the control channel according to the first periodic pattern.

Note that the duration of monitoring the control channel according to the second periodic pattern could be extended, e.g., if the base station provides control information during a slot that is a specified slot according to the first periodic pattern (or possibly if the base station provides control information during any slot) while the wireless device is already monitoring the control channel in accordance with the second periodic pattern, if desired.

Note further that, if desired, a temporal offset may be applied after receiving control information during a specified slot according to the first periodic pattern (e.g., the first slot) before the wireless device begins monitoring the control channel according to the second periodic pattern. This may provide additional time for a wireless device (e.g., with hardware or other limitations that might have difficulty or be unable to do so more quickly) to transition to a more dense control channel monitoring pattern.

Such a multi-stage control channel monitoring framework may further include any number of additional stages, if desired. For example, the wireless device could be configured to monitor the control channel according to a third periodic pattern (e.g., with still denser control channel monitoring frequency, such that the third periodic pattern has a shorter period than the second periodic pattern and/or includes a greater number of slots specified as slots to be monitored by the wireless device during each period than the second periodic pattern) if control information is received during a specified slot according to the second periodic pattern that is not specified according to the first periodic pattern. Once configured to do so, the wireless device may monitor the control channel according to the third periodic pattern for a certain specified duration (e.g., one or more periods according to the first or second periodic pattern, among various possibilities), and may subsequently resume monitoring the control channel according to the second (or possibly first) periodic pattern.

Thus, the provision of the control information by the base station during a slot that is not a specified slot according to the first periodic pattern may occur during a specified slot according to the second periodic pattern (or even the third periodic pattern), according to such a multi-stage periodic monitoring framework.

FIGS. 6-12—Additional Information

FIGS. 6-12 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Cellular communication systems can provide a range of operating configurations, at least some of which may generally be associated with different control channel monitoring frequencies. For example, many cellular communication systems may support an idle mode (e.g., in which a paging channel is periodically monitored to determine if a wireless device should transition to a connected mode) and a connected mode. Even within such a framework, there may be multiple operating configurations for either or both such modes of operation. For example, different idle mode configurations with different discontinuous reception (DRX) periods may be possible.

Within the connected mode, one possible operating configuration may include a configuration in which a wireless device continually monitors a control channel (e.g., a PDCCH). For example, in each subframe or slot (or other temporal unit according to the cellular communication system), there may be a portion in which the control channel is provided, and each wireless device in connected mode may engage in wireless reception activity during at least that portion of each subframe or slot. This may provide the network with maximum scheduling flexibility, e.g., as from the network scheduler perspective, the scheduling flexibility may increase when a greater proportion of the wireless devices served by the network are available for scheduling at any given time instance.

However, in some instances, such an arrangement may result in wireless devices performing a substantial amount of reception activity (e.g., including blind decoding of the control channel) to no effective purpose from the perspective of the wireless device. For example, if a wireless device does not have sufficient data communication needs to perform data communication in every subframe or slot, and/or if the network is sufficiently loaded that there are insufficient network resources for a wireless device to perform data communication in every subframe or slot, there may be at least some subframes or slots in which the wireless device monitors the control channel without receiving any grant, and thus consumes power (e.g., for powering the RF and processing components to monitor and blind decode the control channel) without achieving any actual throughput.

Accordingly, it may be desirable to provide an operating configuration that can reduce the power consumption for wireless devices for control channel monitoring, preferably while minimizing the degradation of scheduling flexibility, at least according to some embodiments.

Figure 6:
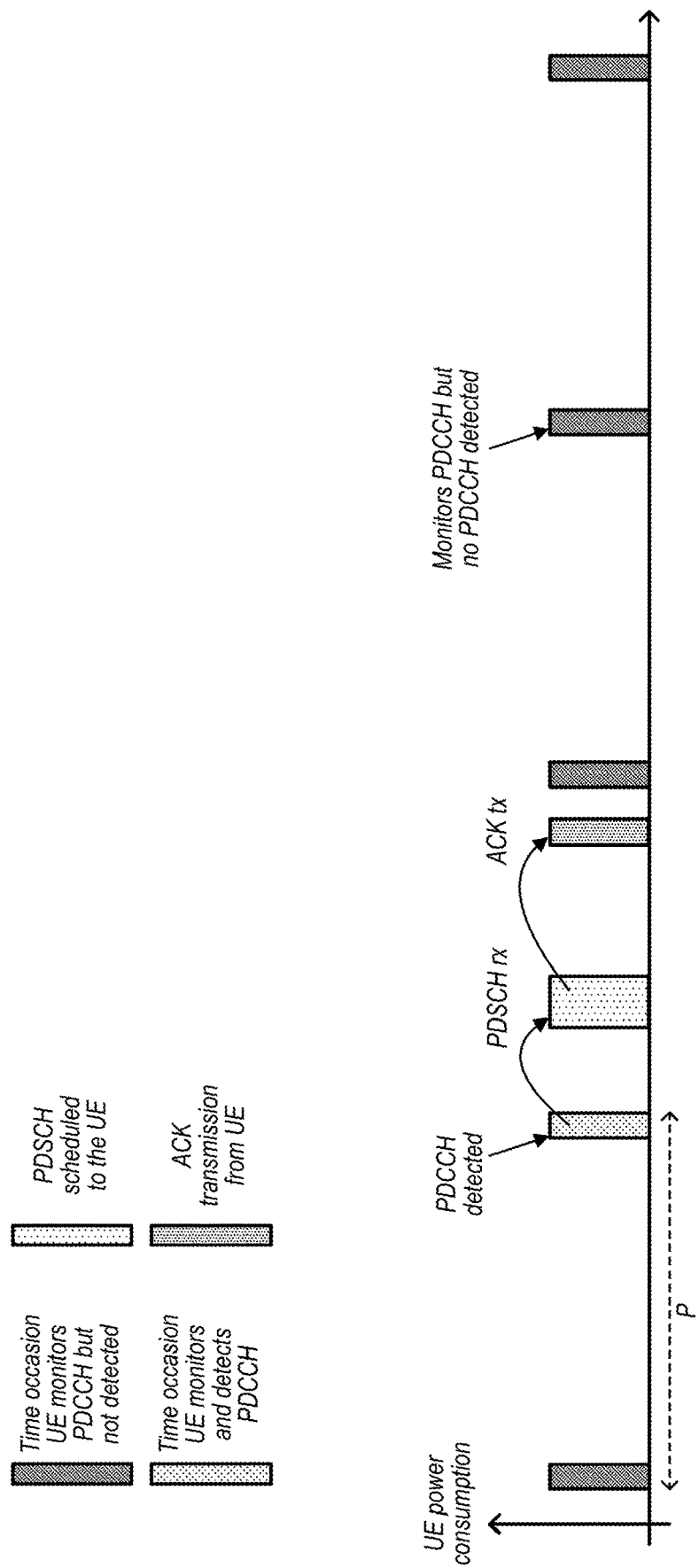

As one possible such approach, it may be possible to provide a periodic monitoring configuration, e.g., in which a wireless device is configured to monitor a control channel periodically. FIG. 6 illustrates an exemplary possible cellular communication timeline in which such an approach is used, in which the control channel is a PDCCH, a PDSCH is used for downlink data communications, and a PUSCH is used for uplink data communications, according to some embodiments. As shown, according to some embodiments, a UE may be configured to monitor the PDCCH with a period P to save power. Thus, every P slots, the UE may monitor the PDCCH. The network may be able to schedule PDSCH/PUSCH/ACK communication for the UE by providing downlink control information (DCI) to the UE using the PDCCH. Such communications may be scheduled for the same slot in which the DCI is provided, or in a subsequent slot, e.g., using K0/K1/K2 values configured to indicate such information. For example, in the illustrated scenario of FIG. 6, the K0 value used to schedule the PDSCH may be greater than 0 (e.g., 1, in which case there may be 1 slot between providing the DCI scheduling the PDSCH and performing the communication using the PDSCH).

In such a framework, if a UE does not detect any control information for the UE on the PDCCH in a specified PDCCH monitoring slot, the UE may be able to enter a lower power state until the next PDCCH monitoring slot. Such a framework may substantially reduce wireless device power consumption, but may also limit network scheduling flexibility, and the maximum possible throughput may be limited by a factor of P, at least according to some embodiments.

Figure 7:
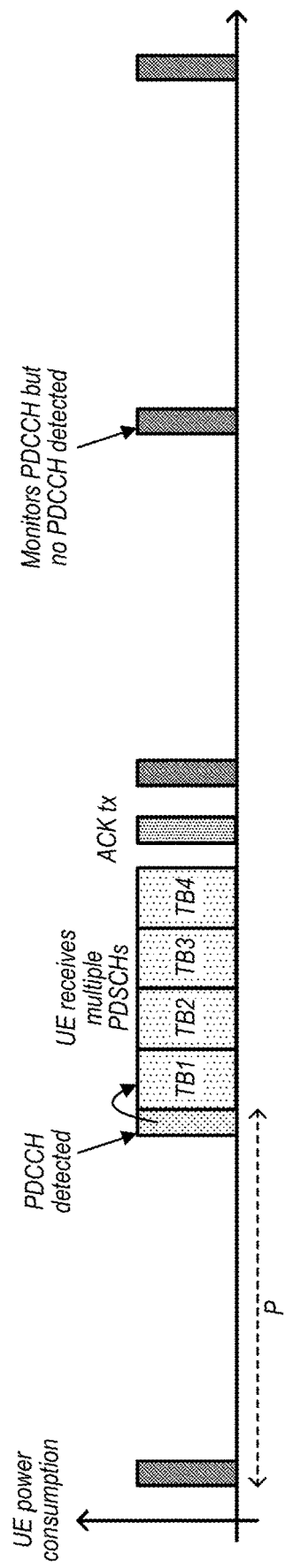

FIG. 7 illustrates an exemplary possible cellular communication timeline in which another possible approach is used, in which a periodic monitoring configuration is also used, but in which it is further possible to schedule multiple transport blocks (TBs) in a single DCI communication or in multiple DCIs in one slot. As shown, according to some embodiments, a UE may be configured to monitor the PDCCH with a period P to save power. Thus, every P slots, the UE may monitor the PDCCH. When DCI is provided using a PDCCH, it may be possible for the DCI to schedule multiple TBs, e.g., with one TB transmitted using one PDSCH portion of a slot. It may also be possible that a UE receives multiple DCIs in a slot, which schedule multiple PDSCH communications across multiple slots. Acknowledgements for TBs could be either bundled (XOR operation) together and sent only once per DCI or could be sent multiple times (e.g., on a per TB basis), among various possibilities, according to such a framework. Such an arrangement may mitigate the throughput limitation to periodic PDCCH monitoring, at least according to some embodiments. However, providing a DCI format capable of scheduling multiple TBs may also represent a substantial design challenge, at least in some instances.

Figure 8:
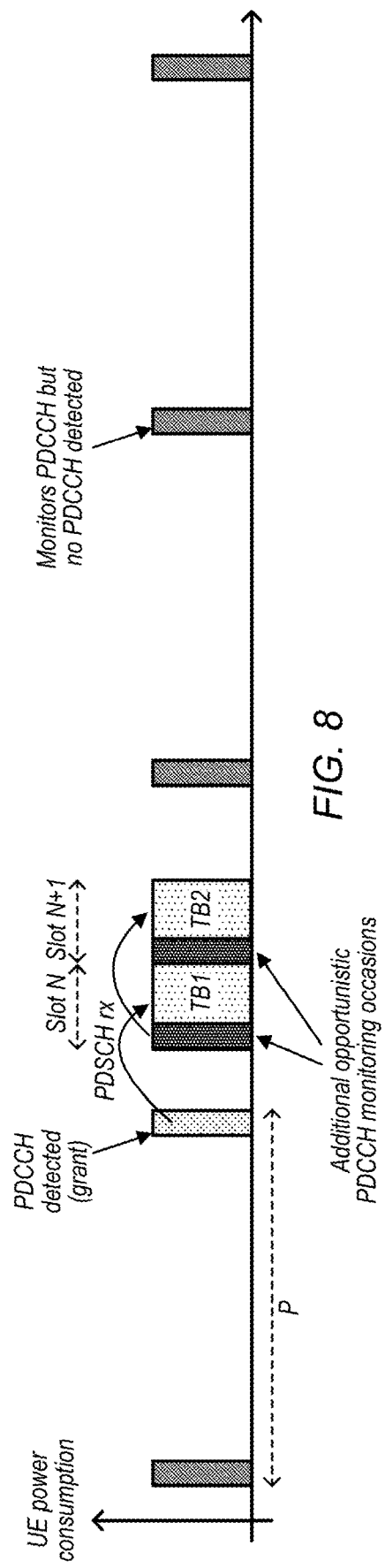

FIG. 8 illustrates an exemplary possible cellular communication timeline in which a still further possible approach is used, in which a periodic monitoring configuration is used, and in which additional opportunistic PDCCH monitoring occasions are provided. According to the illustrated arrangement, a UE may be configured to monitor the PDCCH with a period P to save power. Thus, every P slots, the UE may monitor the PDCCH. Similar to the arrangements of FIGS. 6-7, if the UE does not detect any control information for the UE on the PDCCH in a specified PDCCH monitoring slot, the UE may be able to enter a lower power state until the next PDCCH monitoring slot. If the UE does receive a grant for PDSCH downlink communication, PUSCH uplink communication, or an indication to transmit an ACK in a given slot ('N'), then the UE may be configured to additionally monitor the PDCCH in one or more specified slots (e.g., N, N+1, etc.). Such an approach may work well when cross-slot scheduling is used for PDSCH scheduling (e.g., such as in the scenario illustrated in FIG. 8), among other possibilities. The network may be aware of this opportunistic additional PDCCH monitoring, and so may be able to provide an additional grant, which may give the gNB (e.g., in a NR context) an additional chance to schedule the UE, while minimally increasing the amount of power consumed by the UE for PDCCH monitoring. Further such opportunistic additional PDCCH monitoring occasions may occur if the gNB continues to provide grants to the UE, e.g., such that burst communications in which multiple grants can be provided over a relatively short window may be possible.

Such an approach may also mitigate the throughput limitation to periodic PDCCH monitoring, at least according to some embodiments, and may be possible to implement using a DCI format configured to schedule a single TB, at least in some instances. Since the additional PDCCH monitoring may be performed opportunistically in such an approach, the additional power consumed for the additional PDCCH monitoring may be lower than the additional power consumption that might be introduced by simply reducing the monitoring periodicity.

As a still further possible approach, a multi-stage PDCCH monitoring arrangement may be used. According to such an arrangement, a UE may be configured to monitor the PDCCH with a period P to save power. Thus, every P slots, the UE may monitor the PDCCH. The UE may also be configured with another possible period P' (e.g., with $1<=P'<=P$), and with a duration of dense PDCCH monitoring parameter K (e.g., $>=1$).

Similar to the arrangements of FIGS. 6-8, if the UE does not detect any control information for the UE on the PDCCH in a specified PDCCH monitoring slot, the UE may be able to enter a lower power state until the next PDCCH monitoring slot. If any PDCCH for data scheduling is detected in a specified PDCCH monitoring slot, then the UE may change its PDCCH monitoring periodicity from P to P' for the next K periods, e.g., such that the UE may monitor the PDCCH on one or more additional occasions over the next K periods.

FIGS. 9-10 illustrate exemplary possible cellular communication timelines in which such an approach is used. In the example of FIG. 9, P=4, P'=1, and K=2. Thus, in this example, upon detecting data scheduling in a PDCCH, the UE may monitor the PDCCH in every slot for K*P (e.g., 8, in the illustrated example) slots. In the example of FIG. 10, P=4, P'=2, and K=1. Thus, in this example, upon detecting data scheduling in a PDCCH, the UE may monitor the PDCCH in every other slot for K*P (e.g., 4, in the illustrated example) slots. In each of these examples, during these additional PDCCH monitoring slots, the gNB may thus have more chances to schedule data communications for this UE.

Note that if desired, an implicit indication scheme may be used to trigger or extend a duration of dense PDCCH monitoring, e.g., such that only grant reception events occurring at the PDCCH monitoring slots associated with the initial period P may be considered to trigger or extend a duration of dense PDCCH monitoring, and such that any grant reception event happening in between those Pth slots may not introduce additional PDCCH monitoring in the next period. Alternatively, if desired, a scheme may be used in which additional PDCCH monitoring by a UE is triggered or extended when the PDCCH is detected by the UE regardless of the slot location in which the PDCCH is detected.

Figure 11:
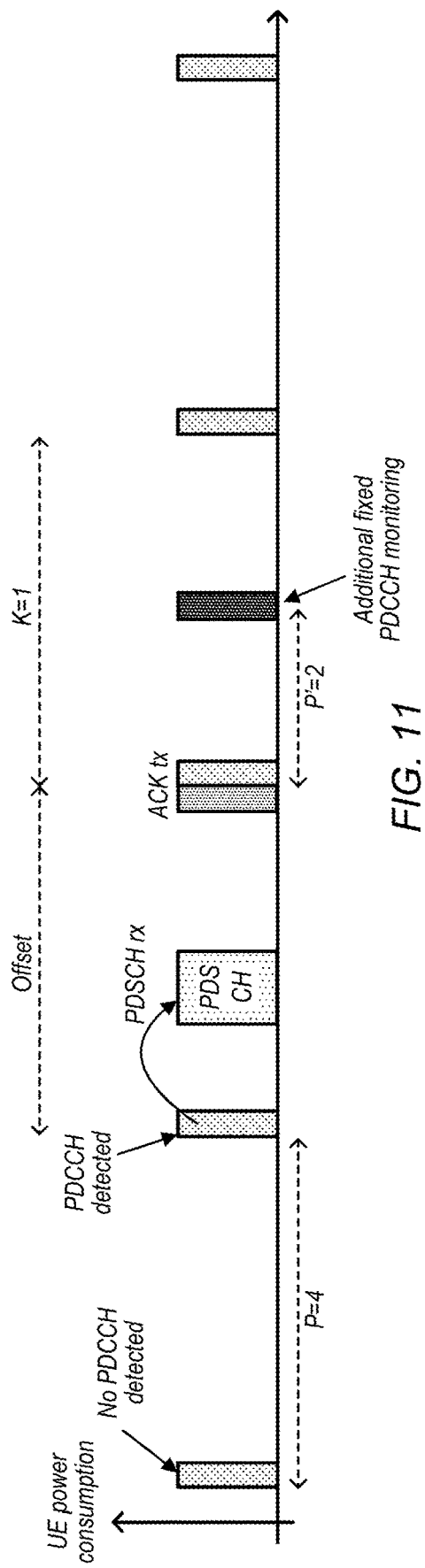

If desired, it may also be possible to introduce an 'action time' or offset to such an approach, e.g., such that there may be a delay between triggering a duration of denser PDCCH monitoring and actually performing PDCCH monitoring at the denser rate of PDCCH monitoring. FIG. 11 illustrates an exemplary possible cellular communication timeline in which such an approach is used. In the illustrated example, similar to FIG. 10, parameter values of P=4, P'=2, and K=1 may be used. Additionally, an offset of 4 slots (e.g., equal to 1*P) may be introduced after the PDCCH is detected before the period of denser PDCCH monitoring begins. Such a technique may be useful if the network desires a longer inter-scheduling time between two packets provided to a UE, among various possibilities.

Note that while FIGS. 9-11 are illustrative of a two-stage approach, a multi-stage approach to PDCCH monitoring in which more than two stages is also possible. For example, a third stage (e.g., with a monitoring periodicity of P'', where $1<=P''<=P'$, for potentially still denser PDCCH monitoring) could be introduced, if desired. Such a stage could be triggered by a UE receiving a grant during an additional PDCCH monitoring slot associated with the second stage, as one possibility, or in any of various other ways, as desired. Similarly, any number of additional stages could be introduced, if desired.

Figure 12:
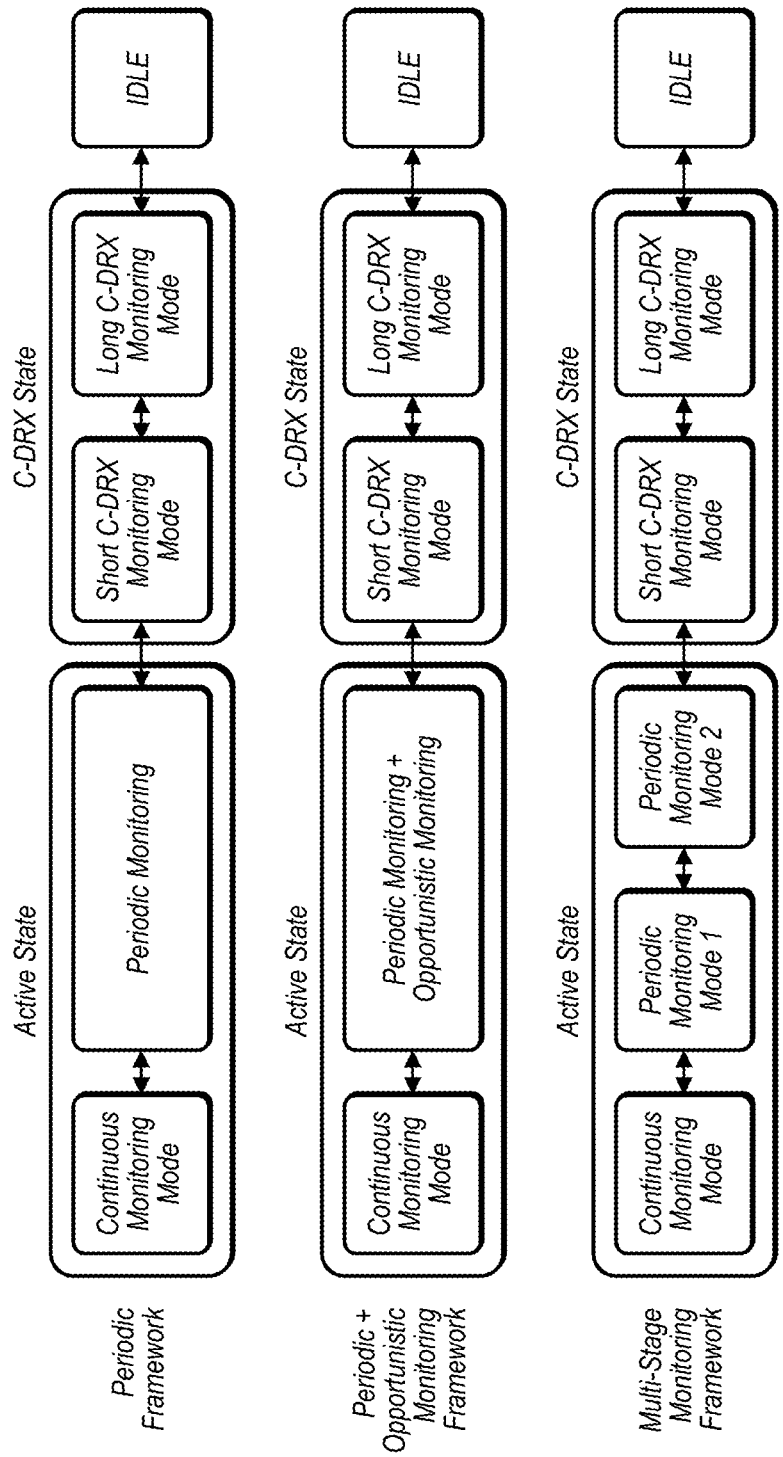
FIG. 12 illustrates various possible example wireless device control channel monitoring state options according to various possible frameworks for control information monitoring in a cellular communication system, according to some embodiments.

FIG. 12 illustrates a high level view of possible UE states for PDCCH monitoring according to various approaches described herein, at least according to some embodiments. As shown, according to a periodic framework, a UE may be capable of continuously monitoring the PDCCH (e.g., monitoring the PDCCH in every slot), or of periodically monitoring the PDCCH (e.g., such as illustrated and described herein with respect to FIG. 6), while in an active state. The UE may also be capable of operating in a C-DRX state, in which state a short C-DRX monitoring mode and a long C-DRX monitoring mode may be possible. The UE may still further be capable of operating in an idle mode.

According to a periodic+opportunistic framework, a UE may be capable of continuously monitoring the PDCCH, or of periodically and opportunistically monitoring the PDCCH (e.g., such as illustrated and described herein with respect to FIG. 8), while in an active state. The UE may also be capable of operating in a C-DRX state and in an idle mode in such a framework.

According to a multi-stage framework, a UE may be capable of continuously monitoring the PDCCH, or of periodically monitoring the PDCCH according to any of two or more periodic monitoring modes (e.g., such as illustrated and described herein with respect to FIGS. 9-11), while in an active state. The UE may also be capable of operating in a C-DRX state and in an idle mode in such a framework.

In the following further exemplary embodiments are provided.

One set of embodiments may include a method, comprising: by a wireless device: monitoring a control channel for control information according to a first periodic pattern, wherein according to the first periodic pattern, the wireless device monitors the control channel in a specified slot during each period of the first periodic pattern, wherein each period of the first periodic pattern comprises a plurality of slots; receiving control information during a first slot, wherein the first slot comprises a specified slot according to the first periodic pattern, wherein the control information received during the first slot schedules a data communication; and monitoring the control channel for control information in at least one slot that is not specified according to the first periodic pattern based at least in part on receiving control information during a specified slot according to the first periodic pattern.

According to some embodiments, monitoring the control channel for control information in at least one slot that is not specified according to the first periodic pattern comprises monitoring the control channel in a second slot, wherein the second slot is immediately subsequent to a slot in which the data communication is scheduled.

According to some embodiments, the method further comprises: receiving control information during the second slot, wherein monitoring the control channel for control information in at least one slot that is not specified according to the first periodic pattern further comprises monitoring the control channel in a third slot based at least in part on receiving control information during the second slot.

According to some embodiments, the method further comprises: monitoring the control channel according to a second periodic pattern based at least in part on receiving control information during a specified slot according to the first periodic pattern, wherein the second periodic pattern has a shorter period than the first periodic pattern, wherein monitoring the control channel for control information in at least one slot that is not specified according to the first periodic pattern comprises monitoring the control channel for control information in a specified slot according to the second periodic pattern.

According to some embodiments, monitoring the control channel according to the second periodic pattern is performed for a specified duration, wherein the method further comprises: resuming monitoring the control channel according to the first periodic pattern after the specified duration.

According to some embodiments, the specified duration occurs at a temporal offset after receiving control information during a specified slot according to the first periodic pattern.

According to some embodiments, the method further comprises: receiving control information during a specified slot according to the second periodic pattern that is not a specified slot according to the first periodic pattern; and monitoring the control channel according to a third periodic pattern based at least in part on receiving control information during a specified slot according to the second periodic pattern that is not a specified slot according to the first periodic pattern, wherein the third periodic pattern has a shorter period than the second periodic pattern.

Another set of embodiments may include a method, comprising: by a cellular base station: providing control information for a wireless device according to a first periodic pattern, wherein, according to the first periodic pattern, if the cellular base station does not provide control information to the wireless device using a control channel in a specified slot during a period of the first periodic pattern, the cellular base station also does not provide control information to the wireless device using the control channel for a remainder of slots of the period; providing control information to the wireless device using the control channel during a first slot, wherein the first slot comprises a specified slot according to the first periodic pattern, wherein the control information provided during the first slot schedules a data communication; and providing control information to the wireless device using the control channel in at least one slot that is not specified according to the first periodic pattern based at least in part on providing control information to the wireless device during a specified slot according to the first periodic pattern.

According to some embodiments, providing control information to the wireless device using the control channel in at least one slot that is not specified according to the first periodic pattern comprises providing control information to the wireless device using the control channel in a second slot, wherein the second slot is immediately subsequent to a slot in which the data communication is scheduled.

According to some embodiments, providing control information to the wireless device on the control channel in at least one slot that is not specified according to the first periodic pattern further comprises providing control information to the wireless device using the control channel in a third slot based at least in part on providing control information during the second slot.

According to some embodiments, the method further comprises: providing control information for the wireless device according to a second periodic pattern based at least in part on providing control information to the wireless device using the control channel during a specified slot according to the first periodic pattern, wherein the second periodic pattern has a shorter period than the first periodic pattern, wherein providing control information to the wireless device using the control channel in at least one slot that is not specified according to the first periodic pattern comprises providing control information to the wireless device using the control channel in a specified slot according to the second periodic pattern.

According to some embodiments, providing control information for the wireless device according to the second periodic pattern is performed for a specified duration, wherein the method further comprises: resuming providing control information for the wireless device according to the first periodic pattern after the specified duration.

According to some embodiments, the specified duration occurs at a temporal offset after providing control information to the wireless device during a specified slot according to the first periodic pattern.

According to some embodiments, the method further comprises: providing control information to the wireless device using the control channel during a specified slot according to the second periodic pattern that is not a specified slot according to the first periodic pattern; and providing control information for the wireless device according to a third periodic pattern based at least in part on providing control information to the wireless device using the control channel during a specified slot according to the second periodic pattern that is not a specified slot according to the first periodic pattern, wherein the third periodic pattern has a shorter period than the second periodic pattern.

According to some embodiments, the control channel comprises a physical downlink control channel.

According to some embodiments, the data communication comprises one of: a downlink data communication; an uplink data communication; or an acknowledgement communication.

A further exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
a radio; and
a processor operably coupled to the radio and configured to cause the wireless device to:
receive, from a base station:
a first control information monitoring configuration including a first periodic pattern comprising a first one or more slots for monitoring during respective periods of the first periodic pattern, the first one or more slots being less than a total number of slots in each of the respective periods of the first periodic pattern; and
a second control information monitoring configuration including a second periodic pattern comprising a second one or more slots for monitoring during respective periods of the second periodic pattern, wherein the second periodic pattern has a different periodicity than the first periodic pattern, the second one or more slots being less than a total number of slots in each of the respective periods of the second periodic pattern,
monitor a control channel for control information from the base station according to the first periodic pattern based on the first control information monitoring configuration, wherein according to the first periodic pattern, the wireless device monitors the control channel in a portion of each slot of the first one or more slots during the respective periods of the first periodic pattern;
trigger, in response to receiving first control information during said monitoring of the control channel according to the first periodic pattern, control channel monitoring according to the second periodic pattern based on the second control information monitoring configuration, instead of monitoring the control channel according to the first periodic pattern, wherein said control channel monitoring according to the second periodic pattern includes monitoring the control channel for control information in a portion of each slot of the second one or more slots during the respective periods of the second periodic pattern; and
monitor the control channel for control information from the base station according to the second periodic pattern.

2. The wireless device of claim 1,
wherein monitoring the control channel for control information from the base station according to the second periodic pattern comprises monitoring the control channel in a fourth slot, wherein the fourth slot is immediately subsequent to a slot in which a data communication is scheduled by the first control information.

3. The wireless device of claim 2, wherein the processor is further configured cause the wireless device to:
receive second control information during the fourth slot, wherein monitoring the control channel for control information from the base station according to the second periodic pattern further comprises monitoring the control channel in a sixth slot based at least in part on receiving the second control information during the fourth slot.

4. The wireless device of claim 1, wherein monitoring the control channel according to the second periodic pattern is performed for a specified duration, wherein the processor is further configured cause the wireless device to:
resume monitoring the control channel according to the first periodic pattern after the specified duration.

5. The wireless device of claim 4,
wherein the specified duration occurs at a temporal offset after receiving the first control information.

6. The wireless device of claim 1, wherein the processor is further configured cause the wireless device to:
receive second control information during a fourth slot of the second one or more slots according to the second periodic pattern that is not among the first one or more slots according to the first periodic pattern; and
monitor the control channel according to a third periodic pattern based at least in part on receiving the second control information during the fourth slot according to the second periodic pattern, wherein the third periodic pattern has a shorter period than the second periodic pattern.

7. The wireless device of claim 1, wherein the processor is further configured to cause the wireless device to:
operate in a low power state for at least a third slot during respective periods of the first periodic pattern.

8. An apparatus, comprising:
a processor configured to cause a wireless device to:
receive, from a base station:
a first control information monitoring configuration including a first periodic pattern comprising a first one or more slots for monitoring during respective periods of the first periodic pattern, the first one or more slots being less than a total number of slots in each of the respective periods of the first periodic pattern; and a second control information monitoring configuration including a second periodic pattern comprising a second one or more slots for monitoring during respective periods of the second periodic pattern, wherein the second periodic pattern has a different periodicity than the first periodic pattern, the second one or more slots being less than a total number of slots in each of the respective periods of the second periodic pattern, monitor a control channel for control information from the base station according to the first periodic pattern based on the first control information monitoring configuration, wherein according to the first periodic pattern, the wireless device monitors the control channel in a portion of each slot of the first one or more slots during the respective periods of the first periodic pattern;

trigger, in response to receiving first control information during said monitoring of the control channel according to the first periodic pattern, control channel monitoring according to the second periodic pattern based on the second control information monitoring configuration, instead of monitoring the control channel according to the first periodic pattern, wherein said control channel monitoring according to the second periodic pattern includes monitoring the control channel for control information in a portion of each slot of the second one or more slots during the respective periods of the second periodic pattern; and monitor the control channel for control information from the base station according to the second periodic pattern.

9. The apparatus of claim 8,
wherein monitoring the control channel for control information from the base station according to the second periodic pattern comprises monitoring the control channel in a fourth slot, wherein the fourth slot is immediately subsequent to a slot in which a data communication is scheduled by the first control information.

10. The apparatus of claim 9, wherein the processor is further configured cause the wireless device to:
receive second control information during the fourth slot, wherein monitoring the control channel for control information from the base station according to the second periodic pattern further comprises monitoring the control channel in a sixth slot based at least in part on receiving the second control information during the fourth slot.

11. The apparatus of claim 8, wherein monitoring the control channel according to the second periodic pattern is performed for a specified duration, wherein the processor is further configured cause the wireless device to:
resume monitoring the control channel according to the first periodic pattern after the specified duration.

12. The apparatus of claim 11,
wherein the specified duration occurs at a temporal offset after receiving the first control information.

13. The apparatus of claim 8, wherein the processor is further configured cause the wireless device to:
receive second control information during a fourth slot of the second one or more slots according to the second periodic pattern that is not among the first one or more slots according to the first periodic pattern; and
monitor the control channel according to a third periodic pattern based at least in part on receiving the second control information during the fourth slot according to the second periodic pattern, wherein the third periodic pattern has a shorter period than the second periodic pattern.

14. The apparatus of claim 8, wherein the processor is further configured to cause the wireless device to:
operate in a low power state for at least a third slot during respective periods of the first periodic pattern.

15. A method, comprising:
at a base station:
providing, to a wireless device:
a first control information monitoring configuration including a first periodic pattern comprising a first one or more slots for monitoring during respective periods of the first periodic pattern, the first one or more slots being less than a total number of slots in each of the respective periods of the first periodic pattern; and
a second control information monitoring configuration including a second periodic pattern comprising a second one or more slots for monitoring during respective periods of the second periodic pattern, wherein the second periodic pattern has a different periodicity than the first periodic pattern, the second one or more slots being less than a total number of slots in each of the respective periods of the second periodic pattern;
providing, to the wireless device, first control information during a third slot of the first one or more slots according to the first periodic pattern based on the first control information monitoring configuration; and
providing, to the wireless device, in response to providing the first control information during the third slot, second control information according to the second periodic pattern based on the second control information monitoring configuration, wherein providing the second control information according to the second periodic pattern includes providing the second control information during a fourth slot of the second one or more slots, wherein the fourth slot is subsequent to the third slot.

16. The method of claim 15, wherein the fourth slot is immediately subsequent to a slot in which a data communication is scheduled by the first control information.

17. The method of claim 15, further comprising:
providing third control information during a in a fifth slot based at least in part on providing the third control information during the fourth slot.

18. The method of claim 15, wherein the second periodic pattern is used for a specified duration, wherein the method further comprises:
resuming the first periodic pattern after the specified duration.

19. The method of claim 18,
wherein the specified duration occurs at a temporal offset after providing the first control information.

20. The method of claim 18, wherein the specified duration is indicated by the first control information monitoring configuration.

* * * * *